US006174427B1

(12) United States Patent
Lundgard

(10) Patent No.: US 6,174,427 B1
(45) Date of Patent: Jan. 16, 2001

(54) PROCESS FOR THE PREPARATION OF ELECTROMOTIVELY COATED FILLED THERMOSET ARTICLES

(75) Inventor: Richard A. Lundgard, Midland, MI (US)

(73) Assignee: The Dow Chemical Company, Midland, MI (US)

( * ) Notice: Under 35 U.S.C. 154(b), the term of this patent shall be extended for 0 days.

(21) Appl. No.: 09/159,987

(22) Filed: Sep. 24, 1998

(51) Int. Cl.[7] ................ C25D 5/54; C25D 5/56
(52) U.S. Cl. ............ 205/158; 524/495; 524/496; 252/511
(58) Field of Search .................. 204/164, 165; 252/511; 205/158; 524/495, 496

(56) References Cited

U.S. PATENT DOCUMENTS

| 2,683,669 | 7/1954 | Coler ..................... 106/193 |
| 3,846,223 | 11/1974 | Lederman et al. ........... 161/162 |
| 3,945,899 | 3/1976 | Nikaido et al. ............. 204/181 |
| 4,038,042 | 7/1977 | Adelman .................. 428/625 |
| 4,265,789 | 5/1981 | Christopherson et al. ...... 252/511 |
| 4,278,510 | 7/1981 | Chien et al. ............... 204/14 R |
| 4,297,145 | 10/1981 | Wolff et al. ............... 106/308 Q |
| 4,321,162 | 3/1982 | Guffens et al. ............. 252/511 |
| 4,510,079 | 4/1985 | Kawai et al. .............. 252/511 |
| 4,515,710 | 5/1985 | Cobbledick ............... 252/511 |
| 4,535,110 | 8/1985 | Iseler et al. ............... 524/110 |
| 4,559,164 | 12/1985 | Kostelnik et al. ........... 252/511 |
| 4,596,669 | 6/1986 | Kleiner et al. ............. 252/511 |
| 4,622,354 | 11/1986 | Iseler et al. ............... 523/527 |
| 4,655,964 | 4/1987 | Steinberger et al. ......... 252/511 |
| 4,680,139 | 7/1987 | Williams et al. ............ 252/511 |
| 4,941,961 | 7/1990 | Noguchi et al. ............ 204/294 |
| 4,974,307 | 12/1990 | Uebayashi et al. ........... 29/460 |
| 4,997,724 * | 3/1991 | Suzuki et al. .............. 428/626 |
| 5,034,437 | 7/1991 | Wykowski ................ 523/454 |
| 5,100,935 | 3/1992 | Iseler et al. ............... 523/514 |
| 5,104,581 | 4/1992 | Ito et al. .................. 252/511 |
| 5,174,924 | 12/1992 | Yamada et al. ............. 252/511 |
| 5,207,949 | 5/1993 | Niino et al. ............... 252/511 |
| 5,250,228 | 10/1993 | Baigrie et al. ............. 252/511 |
| 5,476,612 | 12/1995 | Wessling et al. ............ 252/511 |
| 5,484,838 | 1/1996 | Helms et al. .............. 524/496 |
| 5,490,893 | 2/1996 | Enlow et al. .............. 156/230 |
| 5,491,184 | 2/1996 | McBain et al. ............ 523/436 |
| 5,498,372 | 3/1996 | Hedges .................. 252/511 |
| 5,614,581 | 3/1997 | Cobbledick et al. ......... 524/495 |
| 5,773,536 * | 6/1998 | Mizoguchi et al. .......... 427/307 |
| 5,844,037 | 12/1998 | Lundgard et al. ........... 524/496 |

FOREIGN PATENT DOCUMENTS

| 33 22 016 | 12/1984 | (DE) . |
| 37 32 176 A1 | 9/1987 | (DE) . |
| 0 099 717 A2 | 2/1984 | (EP) . |
| 0 297 364 A1 | 6/1988 | (EP) . |
| 0 283 108 A1 | 9/1988 | (EP) . |
| 0 622 386 A1 | 11/1994 | (EP) . |
| 0 623 782 A2 | 11/1994 | (EP) . |
| 0 685 527 A1 | 12/1995 | (EP) . |
| 3-57610 | 3/1991 | (JP) . |
| 59-138448 | 8/1994 | (JP) . |
| WO 97/34709 | 9/1997 | (WO) . |

OTHER PUBLICATIONS

ASTM Designation: D 256—87, "Standard Test Methods for Impact Resistance of Plastics and Electrical Insulating Materials", pp. 1–17 (Jan. 1988).
ASTM Designation: E 430—91, "Standard Test Methods for Measurement of Gloss of High–Gloss Surfaces by Goniophotometry", pp. 792–798 (Nov. 1991).
ASTM Designation: D 638—87b, "Standard Test Methods for Tensile Properties of Plastics", pp. 18–2 (Feb. 1988).
ASTM Designation: D 790—96a, "Standard Test Methods for Flexural Properties of Unreinforced and Reinforced Plastics and Electrical Insulating Materials", pp. 141–151 (Feb. 1997).
ASTM Designation: D 1510—95, "Standard Test Method for Carbon Black–Iodine Adsorption Number", pp. 283–288 (Apr. 1995).
ASTM Designation: D 1993—91, "Standard Test Method for Precipitated Silica–Surface Area by Multipoint BET Nitrogen Adsorption", pp. 356–361 (May 1991).
ASTM Designation: D 2414—96a, "Standard Test Methods for Carbon Black—b–Dibutyl Phthalate Absorption Number", pp. 392–396 (Jun. 1996).
ASTM Designation D 3037—93, "Standard Test Methods for Carbon Black—Surface Area By Nitrogen Adsorption", pp. 420–432 (May 1993).
ASTM Designation: D 3493—93, "Standard Test Method for Carbon Black—n–Dibutyl Phthalate Absorption Number of Compressed Sample", pp. 536–540 (May 1993).
ASTM Designation: D 3763—93, "Standard Test Methods for High Speed Puncture Properties of Plastic Using Load and Displacement Sensors", pp. 401–406 (Dec. 1993).
ASTM Designation: D 4820—95, "Standard Test Method for Carbon Black—Surface Area by Multipoint B.E.T. Nitrogen Absorption", pp. 756–763 (Apr. 1995).
"Carbon Black for Conductive Plastics", *Technical Bulletin Pigments*, No. 69, pp. 1–22 (1977), No Month Available.

(List continued on next page.)

Primary Examiner—Kathryn Gorgos
Assistant Examiner—Wesley A. Nicolas

(57) ABSTRACT

A process comprising electromotively coating an article molded from a sheet molding compound comprising a mixture of: (a) 10–40 percent by weight of a thermosetting resin, (b) 20–60 percent by weight of calcium carbonate particles, (c) 10–40 percent by weight of glass fibers having an aspect ratio of at least 5 and a length of at least 2 cm, and (d) 0.4–3 percent by weight of a carbon black having a primary particle size of less than 125 nm, a nitrogen surface area of at least 275 $m^2/g$, and a dibutyl phthalate absorption of at least 180 cc/100 g; wherein the article has a conductivity of at least 10-7 Siemens/cm (S/cm), a tensile strength of at least 8,500 psi, and a flexural strength of at least 21,000 psi.

22 Claims, No Drawings

OTHER PUBLICATIONS

Katherine Sawallisch, "Compounding of Sheet Molding Compound", *Polym.–Plast. Technol. Eng.*, vol. 23, No. 1, pp. 1–36 (1984), No Month Available.

Bronislaw J. Jachym, *Carbon–Black–Polymer Composites*: The Physics of Electrically Conducting Composites, "Conduction in Carbon–Black–Doped Polymers", Marcel Dekker, Inc., New York, Ed. Enid Keil Sichel, vol. 3, pp. 103–134 (1982), No Month Available.

Cabot Corporation, "Special Blacks for Plastics", *Technical Report* S–134, pp. 1–10 (Jan. 1990).

Hamid G. Kia et al., *"Sheet Molding Compounds Science and Technology"*, Hanser Publisher, Munich, 1993, pp. 19, 20, 22, 58, 216, 218, No Month Avail.

Hamid G. Kia et al., *"Sheet Molding Compound Science and Technology"*, Hanser Publishers, Munich, 1993, pp. 2–3, No Month Avail.

Hamid G. Kia et al., *"Sheet Molding Compound Science and Technology"*, Hanser Publishers, Munich, 1993, Chap. 12, "Parallel Technologies: BMC and ZMC", pp. 215–234, No Month Avail.

Hamid G. Kia et al., *"Sheet Molding Compound Science Technology"*, Hanser Publishers, Munich, 1993, Chap. 8, "Sheet Molding Compound Rheology", pp. 137–140, No Month Avail.

*Encyclopedia of Polymer Science and Engineering*, "Epoxy Resins", vol. 6, pp. 322–382 (1988), No Month Avail.

*Encyclopedia of Polymer Science and Engineering*, "Phenolic Resins", vol. 11, pp. 45–95 (1998), No Month Avail.

"Conductive Plastic Mfr. from Sheet Moulding cpd.", Derwent 91–120078/17 (1995), No Month Avail.

Chemical Abstract, 107:155882, "Electrically Conductive Polymer Products" (1995), No Month Avail.

Chemical Abstract, 107:69151, "Manufacture of Electrically Conductive Sheets" (1995), No Month Avail.

Chemical Abstract, 115:30812, "Manufacture of Electrically Conductive Plastic Moldings" (1995), No Month Avail.

Chemical Abstract, 115:73190, "Manufacture of Electrically Conductive Laminated Plastic Moldings", (1995), No Month Avail.

* cited by examiner

PROCESS FOR THE PREPARATION OF ELECTROMOTIVELY COATED FILLED THERMOSET ARTICLES

BACKGROUND OF THE INVENTION

This invention relates to electrostatically coatable compositions based on thermosetting polymers and, more particularly, relates to such compositions based on sheet molding compound or bulk molding compound.

It is known to prepare coated articles by electrostatic painting methods. In such methods, a paint or coating is charged or ionized and sprayed on a grounded, conductive article, and the electrostatic attraction between the paint or coating and the grounded article results in a more efficient painting process with less wasted paint material, and thicker and more consistent paint coverage, particularly when the article has a complex shape. When articles fabricated from metals are painted, the metal, which is inherently conductive, is easily grounded and efficiently painted. In recent years, there has been an emphasis on the use of polymeric materials in the manufacture of articles, particularly in applications requiring reductions in weight and improved corrosion resistance, such as automotive applications. However, polymers typically used in such processes are insufficiently conductive to efficiently obtain satisfactory paint thickness and coverage when the article is electrostatically painted.

Methods are known for the incorporation of conductive fillers into polymers in order to improve their conductivity for use in electrostatic coating applications. However, the conductivity of articles made therefrom, as well as the physical, and/or surface appearance properties of the coated articles, may be less than desirable for certain applications. The use of conductive primer compositions to prime the article in order to increase its conductivity is also known. However, depending on the particular primer employed, the cured primer may have adhesion, surface smoothness, hydrolytic stability, and durability characteristics, which are less than desirable for a particular application. In addition, such primers typically contain volatile organic solvents, the emission of which during the priming process may be undesirable.

U.S. Pat. No. 5,490,893 illustrates a method for making a laminate of a thermoformable conductive material and an article of sheet molding compound (SMC) to provide an SMC-based article having good surface conductivity for use in electrostatic coating applications. However, the use of such laminates, or the use of conductive primers, represents extra steps in the forming of the article, the addition of which is less than desirable in a commercial process. European Patent Application No. 623782 describes a method for making vehicle headlight reflectors by injection-molding a bulk-molding compound that contains conductive carbon black. However, bulk-molding compound typically contains a relatively lower proportion of glass fibers, and fibers having a shorter length (which may result in relatively lower physical properties), than SMC, which makes its use less than desirable for certain applications.

SMC is a moldable thermosetting material that is used to prepare structural parts for a variety of applications, including automotive. The material is typically prepared in a continuous process by depositing glass fibers between two or more sheets of a high-viscosity composition comprised of thermosetting polyester resin, calcium carbonate, and alkaline earth metal oxide- or alkali-metal hydroxide- based thickeners between two carrier films of polyethylene. This "sandwich" type of composite is then rolled up and allowed to "mature" and thicken for a period of time to increase the viscosity and handleability of cut portions of the material. The matured rolls of material are then cut into desired shapes for molding, the carrier film is removed, and the SMC is then compression molded into the desired three-dimensional shape of a part having good surface characteristics and physical properties.

Adjusting the formulation of SMC requires a balancing of the desired characteristics of handleability of the uncured SMC material, relatively low viscosity of the resin composition used to make the material (since the resin composition is pumped using conventional pumping equipment instead of high-shear extruders), low cost (achieved by minimizing the amount of resin and maximizing the amount of calcium carbonate), as well as the surface gloss and physical characteristics of the final part. The resin demand characteristics of the components to be added to the formulation and the cost of the proportionate amount of resin needed to achieve the desired low viscosity are several factors that must be taken into account. Carbon black has a high resin demand, relative to glass fiber, calcium carbonate, and the thickening agents typically employed in the preparation of SMC.

SUMMARY OF THE INVENTION

In one aspect, this invention is a process comprising electromotively coating an article molded from a sheet molding compound comprising a mixture of: (a) 10–40 percent by weight of a thermosetting resin, (b) 20–60 percent by weight of calcium carbonate particles, (c) 10–40 percent by weight of glass fibers having an aspect ratio of at least 5 and a length of at least 2 cm, and (d) 0.4–3 percent by weight of a carbon black having a primary particle size of less than 125 nm, a nitrogen surface area of at least 275 $m^2/g$, and a dibutyl phthalate absorption of at least 180 cc/100 g; wherein the article has a conductivity of at least $10^{-7}$ Siemens/cm (S/cm), a tensile strength of at least 8,500 psi, and a flexural strength of at least 21,000 psi.

It has been discovered that electromotively coatable articles based on SMC may be prepared utilizing certain carbon blacks in minimal amounts. It has also been discovered that compositions that employ carbon blacks in such amounts do not result in a loss of physical properties or distinctness-of-image (DOI) properties that would be undesirable for many applications for which such compositions may be employed. These and other aspects of the invention will be apparent from the description that follows.

DETAILED DESCRIPTION OF THE INVENTION

Suitable thermosetting resins, glass fibers, and fillers that may be employed in the composition of the invention include materials that are employed in the preparation of SMC. Examples of thermosetting resins include oligomers or polymers having a molecular weight of greater than 1000 and having pendant functional groups which will react with a crosslinking compound to provide a crosslinked polymer. Further, an article consisting of the crosslinked compound will have a tensile strength of at least 13 MPa (2000 psi). Examples of thermosetting resins include unsaturated polyesters, epoxy resins, vinyl ester resins, and thermosetting phenolic resins. Preferred crosslinking compounds include styrene (for polyester resins), amines (for epoxy resins), styrene or vinyl toluene (for vinyl ester resins), and hexamethylenetetraamine (for phenolic resins). Examples of unsaturated polyester resins are described in U.S. Pat. No.

5,491,184. Examples of vinyl ester resins are described in U.S. Pat. No. 5,034,437. Examples of epoxy resins and thermosetting phenolic resins are described in the *Encyclopedia of Polymer Science and Engineering*, Vol. 6, pp. 322–382 (1988) and Vol. 11, pp. 45–93 (1988), respectively. Further, the term "thermosetting resin" as used herein includes resins containing thermosetting components which, in addition, also contain at least one thermoplastic polymer component in a minor amount, such as a "low profile additive" thermoplastic polymer that is commonly employed in the formulation of SMC compositions. Examples of such include polyvinyl acetate, saturated polyesters, polystyrene, polyacrylates or polymethacrylates, and saturated polyester urethanes. The thermosetting resin is preferably present in an amount, based on the weight of the composition of at least 15 percent, more preferably at least 20 percent; but preferably no greater than 36 percent, more preferably no greater than 32 percent.

The calcium carbonate particles employed preferably have a size in the range of from about 0.1 μm to about 50 μm and an aspect ratio of less than 5. Such particles are preferably employed in an amount by weight, based on 100 parts by weight of the thermosetting resin, of at least 60 parts, more preferably at least 80 parts, and most preferably at least 100 parts; but preferably no greater than 250 parts, more preferably no greater than 220 parts. Based on the weight of the total composition, such particles are preferably present in an amount of at least 22 percent, more preferably at least 27 percent; but preferably no greater than 54 percent, more preferably no greater than 51 percent.

Other fillers or particulate materials which may be used in the SMC include those having a size in the range of from about 0.1 μm to about 50 μm and an aspect ratio of less than 5, which are wholly inorganic particulate materials, particles of inorganic materials which have been surface-treated with an organic material which increases its wettability or dispersibility, carbon blacks (other than the carbon blacks referred as component (d) above), and mixtures thereof. Examples of inorganic particulate materials include glass particles and minerals such as calcium carbonate, dolomite, clays, talc, zinc borate, perlite, vermiculite, alumina trihydrate, and solid or hollow glass microspheres.

Glass fibers used herein have an aspect ratio of at least 5 and a length of at least 2 cm. Suitable polymer-based fibers should comprise polymers that are solid at 25° C. Examples of polymer-based fibers that may also be used include nylon, polyester, polybenzoxazole, and aramid fibers. Fibers may be woven or nonwoven, chopped (if desired), or may be used in the form of fiber bundles coated with a sizing agent. Preferably, the glass fibers are used in an amount by weight, based on 100 parts by weight of resin, of at least 60 parts, more preferably at least 80 parts, and most preferably at least 90 parts; but preferably no greater than 150 parts, more preferably no greater than 130 parts. Based on the weight of the total composition, such fibers are preferably present in an amount of at least 15 percent, more preferably at least 20 percent; but preferably no greater than 38 percent, more preferably no greater than 35 percent. If desired, boron fibers and fibers of extruded resins may also be used to prepare the SMC.

The combined volume percentage of fillers and glass fibers present in the composition, based on the total volume of the composition, is preferably at least 30 percent, more preferably at least 40 percent, but is preferably no greater than 80 percent, more preferably no greater than 70 percent.

Examples of suitable carbon blacks include particles of carbon having an average primary particle diameter of less than 125 nm, more preferably less than 60 nm. The carbon black is preferably utilized as an aggregate or agglomerate of primary particles, the aggregate or agglomerate having a size of 5 to 10 times the primary particle size. The carbon black preferably does not comprise a graphite form of carbon. Larger agglomerates, beads, or pellets of carbon particles may also be utilized as a starting material in the preparation of the composition, so long as they disperse during the preparation or processing of the composition sufficiently to reach an average size in the cured composition of less than 10 microns, more preferably less than 5 microns, and most preferably less than 1.25 microns. The carbon black preferably has a nitrogen surface area of at least 275 $m^2/g$, more preferably at least 500 $m^2/g$, and most preferably at least 750 $m^2/g$. The nitrogen surface area of the carbon black may be determined using ASTM Method No. D 3037-93. The dibutyl phthalate absorption of the carbon is preferably at least 180 cc/100 g, more preferably at least 250 cc/100 g, and most preferably at least 300 cc/100 g, and may be measured according to ASTM Method No. D 2414-93. The carbon black is preferably used in an amount by weight, based on 100 parts by weight of resin, of at least 0.5 parts, more preferably at least 1 part, and most preferably at least 1.5 parts; but preferably no greater than 9 parts, more preferably no greater than 7 parts. Based on the total weight of the composition, the carbon black is employed in an amount of less than 2.5 weight percent, more preferably less than 2 weight percent, more preferably less than 1 weight percent, and most preferably less than 0.9 weight percent.

Suitable thickeners include alkaline earth metal oxides and hydroxides. Preferably, the thickener is magnesium oxide, magnesium hydroxide, calcium oxide, or calcium hydroxide, a mixture thereof, and is most preferably magnesium oxide, magnesium hydroxide, or a mixture thereof. The thickener is preferably used in an amount by weight, based on 100 parts by weight of resin, of no greater than 10 parts, more preferably no greater than 4 parts.

Other ingredients which may also be present in the composition include crosslinking compounds, initiators, mold release agents, free-radical inhibitors such as benzoquinone or hydroquinone, catalysts such as organic peroxides or hydroperoxides, and colorants. In addition, electronically conductive additives other than carbon black may also be utilized in the preparation of the compositions. The carbon black and other conductive additives are employed in an amount sufficient to provide a conductivity of at least $10^{-14}$ S/cm, but the combined weight percentage of the carbon black and other conductive additives may not exceed 3 percent, based on the weight of the composition. Examples of such additives include conductive salts, carbon fibers, graphite fibers, and particles of conductive polyaniline. The viscosity of the resin-containing composition prior to combining it with the glass fibers is preferably at least 4,000 cps, more preferably at least 8,000 cps, most preferably at least 10,000 cps; but preferably no greater than 80,000 cps, more preferably no greater than 70,000 cps, and most preferably no greater than 60,000 cps, as measured by rotational viscometry (such as, for example, a Brookfield viscometer) at a temperature of about 25° C.

The composition may be prepared by any method suitable for mixing the components and curing the thermosetting resin. Preferably, in processes for the preparation of SMC, the resin, fillers, carbon black, curing agents, and all other components except for the glass fibers, are thoroughly mixed together in two separate batches having similar volumes, one containing the thermosetting agent and the other containing any initiators or crosslinking compounds.

The batches are then combined and deposited in sheet form onto carrier sheets of an inert plastic material such as polyethylene. The glass fibers are then deposited between two sheets of the resin-containing material and compressed, forming a composite of the sheets and the material. The composition is then stored for several days to permit it to thicken, and then cut into a suitable shape and heated and/or molded under conditions sufficient to cure the thermosetting resin.

The composition preferably has a conductivity of at least $5\times10^{-7}$ S/cm, and more preferably at least $1\times10^{-6}$ S/cm. The conductivity of the composition may be measured according to the procedure set forth below.

Once fabricated, the electronically conductive article can be painted or coated on at least one of its surfaces using any suitable electromotive coating process. The term "electromotive coating process" as used herein refers to any coating process wherein an electrical potential exists between the substrate being coated and the coating material. Examples of electromotive coating processes include electrostatic coating of liquids or powders, electrodeposition ("E-Coat") processes, electromotive vapor deposition, and electroplating processes. The article may be painted or coated with any suitable water-based or organic-based composition (or water/organic mixture), including conductive primer compositions which further enhance the electronic conductivity of the article, or with a solventless organic composition by a powder coating or vapor deposition method.

The DOI gloss characteristics of the coated article may be measured by ASTM Test Method No. E 430-91. The physical properties of the coated or uncoated article may be determined by ASTM Test Method Nos. D 638 (Tensile Strength, Tensile Elongation, and Tensile Modulus), D 790 (Flexural Stress, Flexural Strain, Flexural Modulus), D 3763 (Dynatup Impact), and D 256 (Notched Izod). The tensile strength of the molded and cured composition is preferably at least 9,000 psi, more preferably at least 9,500 psi. Its tensile modulus is preferably at least 0.8 million psi, more preferably at least 1,000,000 psi, and most preferably at least 1.2 million psi. Its flexural strength is preferably at least 22,000 psi, more preferably at least 23,000 psi; its flexural modulus is preferably at least 0.8 million psi, more preferably at least 1 million psi, most preferably at least 1.2 million psi, and its Notched Izod impact strength is preferably at least 6 ft-lb/inch, more preferably at least 8 ft-lb/inch, most preferably at least 10 ft-lb/inch.

The coated articles prepared by the process of the invention are useful in any application for coated plastic articles, but are particularly useful as components in applications where the use of a lightweight non-corrosive material is desirable, such as automotive and other transportation applications, as well as static-dissipation and shielding applications.

Illustrative Embodiments

The following examples are not intended to limit the scope of the invention in any way. Unless stated otherwise, all parts and percentages are given by weight.

EXAMPLE 1

A mixture containing carbon black is prepared by mixing 180 g of an unsaturated polyester resin/styrene mixture (Aropol Q-6585, available from Ashland Chemical), 120 g of low profile additive (LP40A, a solution of polyvinyl acetate containing styrene, available from Union Carbide), 3.0 g of a peroxybenzoate initiator (Trigonox C, available from Akzo Nobel), 14.1 g of a 38 weight percent dispersion of MgO (PG 9033, available from Plasticolors (Ashtabula, Ohio)), 14.4 g of a mold release compound (S-1058, zinc stearate, available from Synpro (Cleveland, Ohio)), 441.3 g of calcium carbonate (Atomite, available from E.C.C. International (Atlanta, Ga.)), and 6.0 g of conducting carbon black (Black Pearls 2000, available from Cabot Corp.). After mixing for several minutes, 327.6 g of glass fiber (Type 5509 Roving, available from PPG Industries) is deposited between two layers of the resulting paste. The resulting composite is then calendered between two sheets of polyethylene film to form a composite with a thickness of about 6 mm. The sheet is stored for 1 to 3 days, and 15-cm-by-15-cm test plaques are cut therefrom and molded in a compression molder at 300° F. (149° C.) for 3 minutes under 10,000 lbs (4545 kg) of pressure. Approximately 160 g of material is used for each plaque. The plaques are removed from the mold and trimmed for testing. The conductivity of the plaques is tested according to the following procedure: portions of each side of the plaque which are located directly opposite to each other are painted with a 1-cm-by-1-cm square of silver paint (available from SPI Supplies (Westchester, Pa.)). Conductive graphite paper (Grafoil™, available from UCAR Carbon Co. (Cleveland, Ohio)) is pressed against the painted area and resistance is measured with a 9-volt digital ohmmeter with its leads connected to the graphite paper. The conductivity of the plaque (S/cm) is calculated by dividing the thickness of the plaque, in cm, by the measured resistance. The physical properties of the plaques are tested in accordance with the ASTM test methods referred to above. The plaque has a conductivity of at least $1\times10^{-7}$ S/cm.

EXAMPLES 2–10

Example 1 is repeated using the amounts of carbon black and the particular carbon blacks shown in Table 1. In Table 1, "XE 2" refers to Printex XE 2, a conducting carbon black available from Degussa Corp., "XC 72" refers to Vulcan XC-72, a conducting carbon black available from Cabot Corp., and "BP 2000" refers to Black Pearls 2000, a conducting carbon black available from Cabot Corp. In Examples 2–8, the amount of calcium carbonate is adjusted in order to keep the total volume of carbon black and calcium carbonate the same as in Example 1. In Examples 9 and 10, the amount of calcium carbonate is 150 parts by weight per 100 parts of polyester resin (which is a 60/40 weight percent mixture of Aropol Q-6585 and LP40A, respectively). The plaques are prepared and tested in accordance with the procedure described in Example 1. All plaques have a conductivity of at least $1\times10^{-7}$ S/cm.

TABLE 1

| Example | Carbon Black Loading and Type |
| --- | --- |
| 1 | 0.54% BP 2000 |
| 2 | 0.68% BP 2000 |
| 3 | 0.81% BP 2000 |
| 4 | 1.1% BP 2000 |
| 5 | 0.54% XE 2 |
| 6 | 0.81% XE 2 |
| 7 | 1.1% XE 2 |
| 8 | 1.36% XC 72 |
| 9 | 1.9% XC 72 |
| 10 | 2.4% XC 72 |

EXAMPLE 11–14

Example 1 is repeated four times using the same carbon black, except that the carbon black is utilized in the amounts of 0.54, 0.81, 1.1, and 1.4 percent by weight of the total composition, respectively, for each example, and the amount of calcium carbonate utilized in each example is 150 parts by weight per 100 parts of polyester resin (which is a 60/40 weight percent mixture of Aropol Q-6585 and LP40A, respectively). Plaques of the compositions are prepared and their conductivities tested in accordance with the procedure described in Example 1. The conductivities of the plaques are at least $1 \times 10^{-7}$ S/cm.

What is claimed is:

1. A process comprising
   providing an article compression molded from a sheet molding compound which comprises (a) 10–40 percent by weight of a thermosetting resin, (b) 20–60 percent by weight of calcium carbonate particles, (c) 10–40 percent by weight of glass fibers having an aspect ratio of at least 5 and a length of at least 2 cm, and (d) 0.4–3 percent by weight of a carbon black having a primary particle size of less than 125 nm, a nitrogen surface area of at least 275 m²/g and a dibutyl phthalate absorption of at least 180 cc/100 g, said article having a conductivity of at least $10^{-7}$ Siemens/cm (S/cm), a tensile strength of at least 8,500 psi, and a flexural strength of at least 21,000 psi;
   electromotively coating the article with a coating material.

2. The process of claim 1 wherein the thermosetting resin is present in an amount, based on the weight of the composition, of at least 15 percent.

3. The process of claim 1 wherein the thermosetting resin is present in an amount, based on the weight of the composition, of at least 20 percent.

4. The process of claim 1 wherein the thermosetting resin is present in an amount, based on the weight of the composition, of no greater than 36 percent.

5. The process of claim 1 wherein the thermosetting resin is present in an amount, based on the weight of the composition, of no greater than 32 percent.

6. The process of claim 1 wherein the calcium carbonate particles are present in an amount, based on the weight of the composition, of at least 22 percent.

7. The process of claim 1 wherein the calcium carbonate particles are present in an amount, based on the weight of the composition, of at least 27 percent.

8. The process of claim 1 wherein the calcium carbonate particles are present in an amount, based on the weight of the composition, of no greater than 54 percent.

9. The process of claim 1 wherein the calcium carbonate particles are present in an amount, based on the weight of the composition, of no greater than 51 percent.

10. The process of claim 1 wherein the glass fibers are present in an amount, based on the weight of the composition, of at least 15 percent.

11. The process of claim 1 wherein the glass fibers are present in an amount, based on the weight of the composition, of at least 20 percent.

12. The process of claim 1 wherein the glass fibers are present in an amount, based on the weight of the composition, of no greater than 38 percent.

13. The process of claim 1 wherein the glass fibers are present in an amount, based on the weight of the composition, of no greater than 35 percent.

14. The process of claim 1 wherein the carbon black has a nitrogen surface area of at least 500 m²/g.

15. The process of claim 1 wherein the carbon black has a nitrogen surface area of at least 750 m²/g.

16. The process of claim 1 wherein the dibutyl phthalate absorption of the carbon black is at least 250 cc/100 g.

17. The process of claim 1 wherein the dibutyl phthalate absorption of the carbon black is at least 300 cc/100 g.

18. The process of claim 1 wherein component (d) is present in an amount, based on the weight of the composition, of less than 2.5 percent.

19. The process of claim 1 wherein component (d) is present in an amount, based on the weight of the composition, of less than 2 percent.

20. The process of claim 1 wherein component (d) is present in an amount, based on the weight of the composition, of less than 1 percent.

21. The process of claim 1 wherein component (d) is present in an amount, based on the weight of the composition, of less than 0.9 percent.

22. The process of claim 1 wherein the coating step is selected from the group consisting of electrostatic coating of liquids or powders, electrodeposition processes, electromotive vapor deposition and electroplating processes.

* * * * *